United States Patent
Ashihara et al.

(10) Patent No.: US 9,470,266 B2
(45) Date of Patent: Oct. 18, 2016

(54) SLIDE BEARING

(71) Applicants: TAIHO KOGYO CO., LTD., Toyota-shi, Aichi (JP); TOYOTA JIDOSHA KABUSHIKI KAISHA, Toyota-shi, Aichi (JP)

(72) Inventors: Katsuhiro Ashihara, Toyota (JP); Yuichiro Kajiki, Toyota (JP); Hiroki Takata, Toyota (JP); Akihiro Honda, Susono (JP); Motoichi Murakami, Gotemba (JP)

(73) Assignees: TAIHO KOGYO CO., LTD., Toyota-Shi (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/769,604

(22) PCT Filed: Feb. 21, 2014

(86) PCT No.: PCT/JP2014/054206
§ 371 (c)(1),
(2) Date: Aug. 21, 2015

(87) PCT Pub. No.: WO2014/129595
PCT Pub. Date: Aug. 28, 2014

(65) Prior Publication Data
US 2015/0377285 A1    Dec. 31, 2015

(30) Foreign Application Priority Data

Feb. 22, 2013 (JP) .................................. 2013-033837

(51) Int. Cl.
*F16C 33/10* (2006.01)
*F16C 17/02* (2006.01)
*F16C 9/02* (2006.01)

(52) U.S. Cl.
CPC ............. *F16C 33/1065* (2013.01); *F16C 9/02* (2013.01); *F16C 17/022* (2013.01); *F16C 2240/30* (2013.01)

(58) Field of Classification Search
CPC .......... F16C 9/02; F16C 9/04; F16C 17/022; F16C 33/1065
USPC ........................................ 384/288, 291, 294
See application file for complete search history.

(56) References Cited

U.S. PATENT DOCUMENTS

| | | | | |
|---|---|---|---|---|
| 3,680,932 A | * | 8/1972 | Raimondi | F01D 25/166 384/291 |
| 6,082,904 A | * | 7/2000 | Ono | F16C 9/00 384/283 |
| 8,905,639 B2 | * | 12/2014 | Ishigo | F16C 9/02 384/288 |

(Continued)

FOREIGN PATENT DOCUMENTS

| | | |
|---|---|---|
| JP | H03-48017 A | 3/1991 |
| JP | 2001032837 A * | 2/2001 |

(Continued)

OTHER PUBLICATIONS

Extended European Search Report issued on Apr. 11, 2016 in EP Application No. 14754900.0-1751.

*Primary Examiner* — Phillip A Johnson
(74) *Attorney, Agent, or Firm* — Kenyon & Kenyon LLP

(57) ABSTRACT

Provided is a slide bearing with which friction-reducing effects can be obtained and the total volume of effluent oil can be limited. A slide bearing in which halved members made by dividing a cylinder in two in a direction parallel to the axial are disposed vertically, wherein narrow grooves are provided at the ends of the slide bearing in the axial direction, the narrow grooves extending in the circumferential direction from the mating surface on the downstream side of the rotation direction to a specified bearing angle is an angle rotated in the range of ≥0 degree to ≤90 degrees from the mating surface on the downstream side in the rotation direction (bearing angle of 180 degrees) towards the upstream side in the rotation direction. In other words, the bearing angle is the range of 180 degrees to 270 degrees.

3 Claims, 7 Drawing Sheets

(56) References Cited

U.S. PATENT DOCUMENTS

| | | |
|---|---|---|
| 2002/0085779 A1 | 7/2002 | Niwa et al. |
| 2004/0062458 A1 | 4/2004 | Mian et al. |
| 2005/0175263 A1 | 8/2005 | Nanbu et al. |
| 2010/0119181 A1 | 5/2010 | Ishigo et al. |

FOREIGN PATENT DOCUMENTS

| | | |
|---|---|---|
| JP | 2002-188624 A | 7/2002 |
| JP | 2003-532036 A | 10/2003 |
| JP | 2005-249127 A | 9/2005 |
| JP | 2009-192029 A | 8/2009 |

* cited by examiner

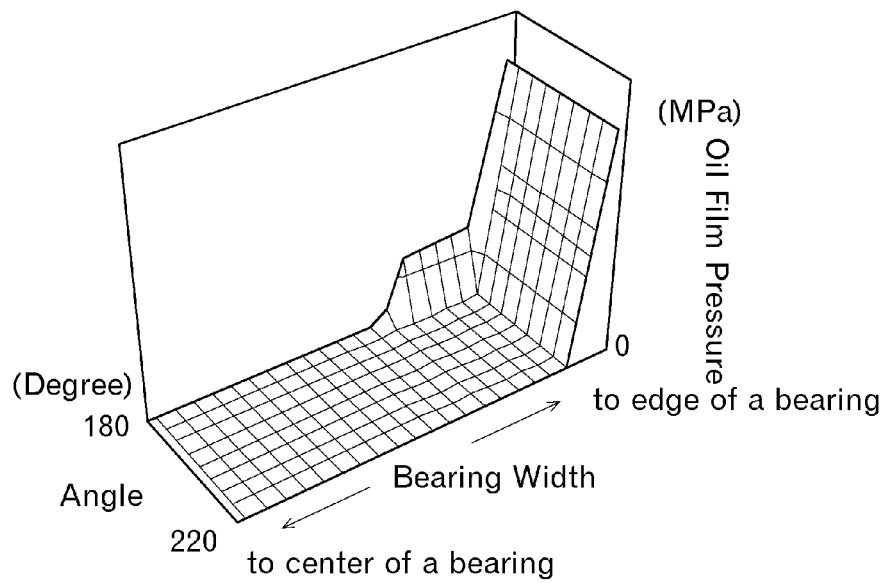
Fig.6(a) With grooves
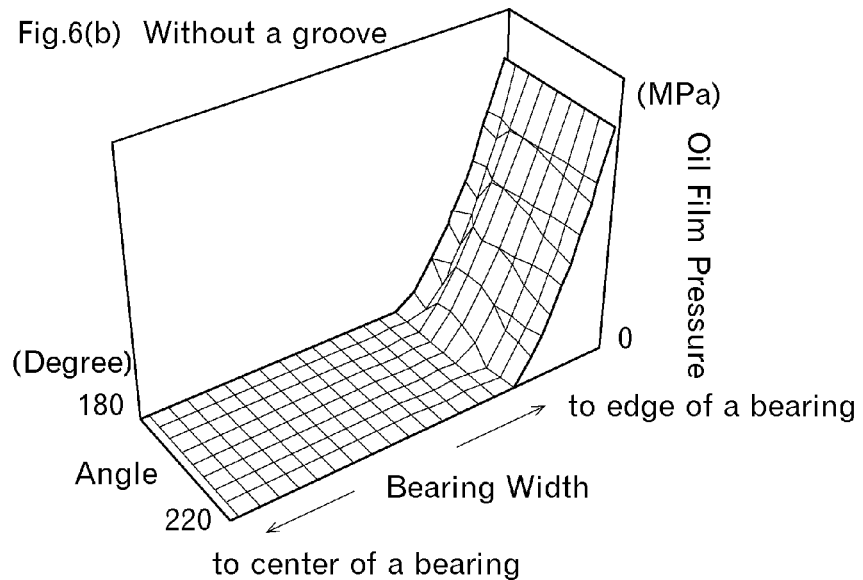
Fig.6(b) Without a groove

Fig.7(a) With grooves
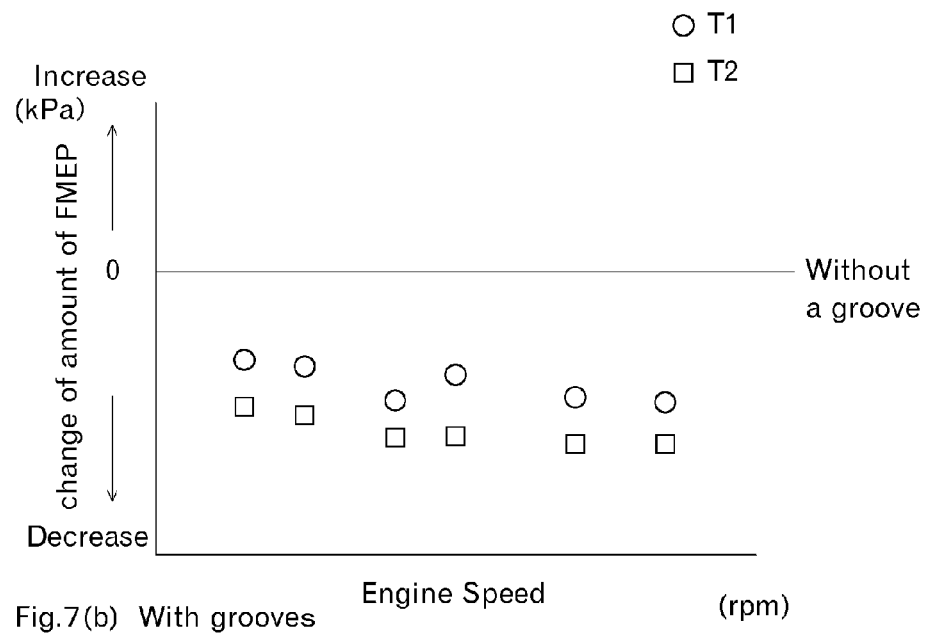
Fig.7(b) With grooves
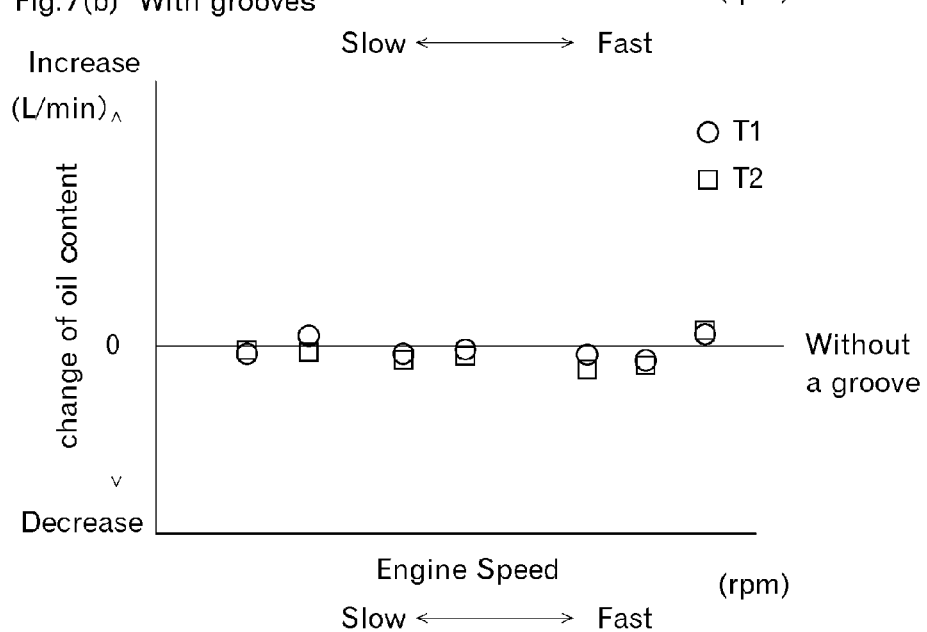

SLIDE BEARING

CROSS-REFERENCE TO RELATED APPLICATIONS

This is a national phase application based on the PCT International Patent Application No. PCT/JP2014/054206 filed Feb. 21, 2014, claiming priority to Japanese Patent Application No. 2013-033837 filed Feb. 22, 2013, the entire contents of both of which are incorporated herein by reference.

TECHNICAL FIELD

The present invention relates to a slide bearing. In detail, the present invention relates to a slide bearing having vertically disposed halved members which is made by dividing a cylinder in two in a direction parallel to the axial direction.

BACKGROUND ART

Conventionally, a slide bearing for holding crankshaft of an engine rotatably that has halved structure in which two members divided in two are mated is known. In order to reduce the frictional area of the bearing and to get friction-reducing effect, the width of the bearing is reduced. However, reducing the width of the bearing causes increase of volume of effluent oil. Then, it is publicly known that relief parts (narrow grooves) all over the circumference are configured at the both ends of the bearing in the axial direction (Patent Literature 1).

PRIOR ART REFERENCE

Patent Literature

Patent Literature 1: the Japanese Translation of PCT International Application Publication No. 2003-532036

DISCLOSURE OF INVENTION

Problems to be Solved by the Invention

However, in the conventional bearing in which grooves all over the circumference are configured, reducing a friction area causes decrease of the load carrying capacity and the oil film thickness which are necessary for good lubrication are not able to be kept and also the total volume of effluent oil is much.

In consideration of the above problems, the present invention provides a slide bearing for getting friction-reducing effect and to suppress total volume of effluent oil.

Means for Solving the Problems

Problems to be solved by the invention are described as above and the means for solving the problems is explained.

According to certain embodiments of the present invention, in a slide bearing in which halved members made by dividing a cylinder in two in a direction parallel to the axial are disposed vertically, narrow grooves are provided at an end of the lower halved member in a circumferential direction from a mating surface on a downstream side of a rotation direction to a specified bearing angle and the specified bearing angle is an angle which is rotated in the range of $\geq 0$ degree to $\leq 90$ degrees from the mating surface on the downstream side of the rotation direction.

According to certain embodiments of the present invention, a length of the narrow groove is from the mating surface on the downstream side of the rotation direction to a place of the upstream side where oil film thickness becomes minimum.

According to certain embodiments of the present invention, a length of the narrow groove is from the mating surface on the downstream side of the rotation direction to a place of the upstream side where oil film pressure gradient becomes maximum.

According to certain embodiments of the present invention, a length of the narrow groove is a length by which a percentage of the minimum oil film thickness of the slide bearing in which the narrow grooves are processed to the specified bearing angle to a minimum oil film thickness of a slide bearing without grooves is more than 80%.

Effect of the Invention

As effects of the invention, the effects shown as below are caused.

Namely, by providing the narrow grooves which do not prevent the generation of the oil film pressure, the friction-reducing effect can be obtained with reducing the frictional area and the total volume of effluent oil can be reduced.

BRIEF DESCRIPTION OF DRAWINGS

FIG. 2(*c*) is a B-B line sectional view.

FIG. 6(*a*) is three-dimensional graph which shows gradient of oil film pressure of the slide bearing with narrow groove, and FIG. 6(*b*) is three-dimensional graph which shows gradient of oil film pressure of the slide bearing without narrow groove(as calculated value).

FIG. 7(*a*) is a graph which shows the relation between engine speed and change amount of the Friction Mean Effective Pressure (FMEP) concerning the bearing with grooves and FIG. 7(*b*) is a graph which shows the relation between engine speed and change volume of the oil per minute concerning the bearing with grooves(as experimental value).

DETAILED DESCRIPTION OF THE INVENTION

Figure 1:
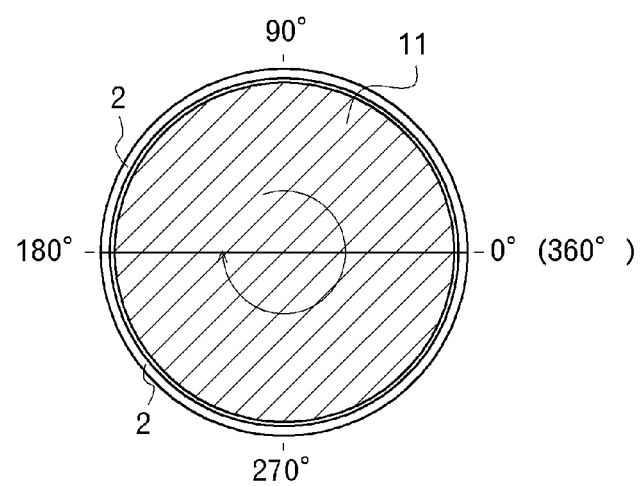
FIG. 1 is a front view of a slide bearing according to this embodiment.

An embodiment of the invention is explained. FIG. 1 is the front view of the slide bearing and the up and down direction on the drawing is defined as the up and down direction and the near and far direction on the drawing is defined as the axial direction (the front and back direction).

Figure 2A:
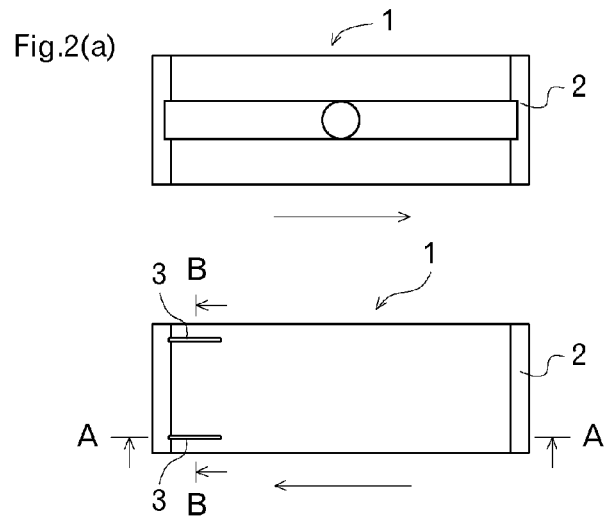
FIG. 2(*a*) is a plan view of a halved member of the slide bearing according to the first embodiment, FIG. 2(*b*) is a A-A line sectional view.
Figure 2B:
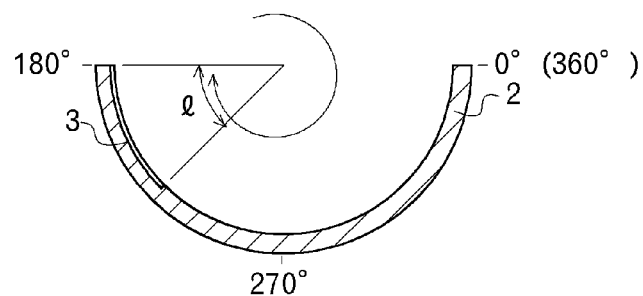
Figure 2C:
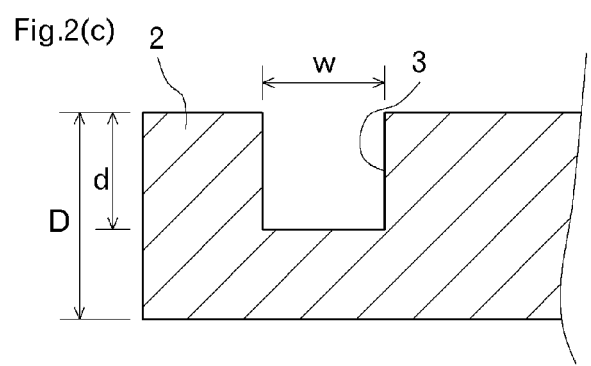

Firstly, the halved members 2 which configure the slide bearing 1 concerning the first embodiment are explained with the FIG. 1 and the FIG. 2.

The slide bearing 1 is cylindrical member and it is adopted to the slide bearing structure of the crankshaft 11 of the engine as shown in FIG. 1. The slide bearing 1 is configured by the two halved members 2, 2. The halved members 2, 2 have the shapes in which the cylinder has been divided in two in the direction parallel to the axial direction and are shaped as semicircle shape on the cross-section view. In the embodiment, the halved members 2, 2 are disposed in the top and the bottom and the mating surfaces are shaped at the right and the left. In the case that the crankshaft 11 is held by the slide bearing 1, the clearance gap is configured and lubricating oil is supplied from oil route which is not shown toward the clearance gap.

In the FIG. 2(*a*), upper and lower halved members 2 are shown. In the embodiment, the rotation direction of the crankshaft 11 is clockwise direction on the front view as the vector shown in the FIG. 1. In the bearing angle $\omega$, the right edge in the FIG. 2(*b*) is defined as 0 degree and the counter clockwise direction shown in FIG. 2(*b*) is positive direction. Thus, in the FIG. 2(*b*), the bearing angle $\omega$ at the left edge is defined as 180 degrees and the bearing angle $\omega$ at the down edge is defined as 270 degrees.

A groove is provided in the circumferential direction at the inner circumference of the upper halved member 2 and the circle hole is provided at the center. The mating surfaces are disposed at the right and left side of the upper halved member 2

In the slide surface of the inner circumference of the lower halved member 2, narrow grooves 3 are configured at the edge in the axial direction.

The narrow grooves 3 are provided at the lower halved member 2. In the embodiment, the narrow grooves 3 are provided as two lines parallel to the axial direction. In detail, narrow grooves 3 are provided from the mating surface on the downstream side of the rotation direction of the crankshaft 11 (the bearing angle $\omega$ is 180 degrees) toward the direction in which the bearing angle $\omega$ is positive number (the counter clockwise direction). Thus, in the lower halved member 2, the mating surface on the right side in the FIG. 2(*b*) is the mating surface on the downstream side of the rotation direction and the mating surface on the left side in the FIG. 2(*b*) is the mating surface on the upstream side in the rotation direction.

As shown in the FIG. 2(*c*), the narrow groove 3 is configured as the depth d is shallower than the bearing thickness D. The width of the narrow groove 3 is configured as w.

Figure 3:
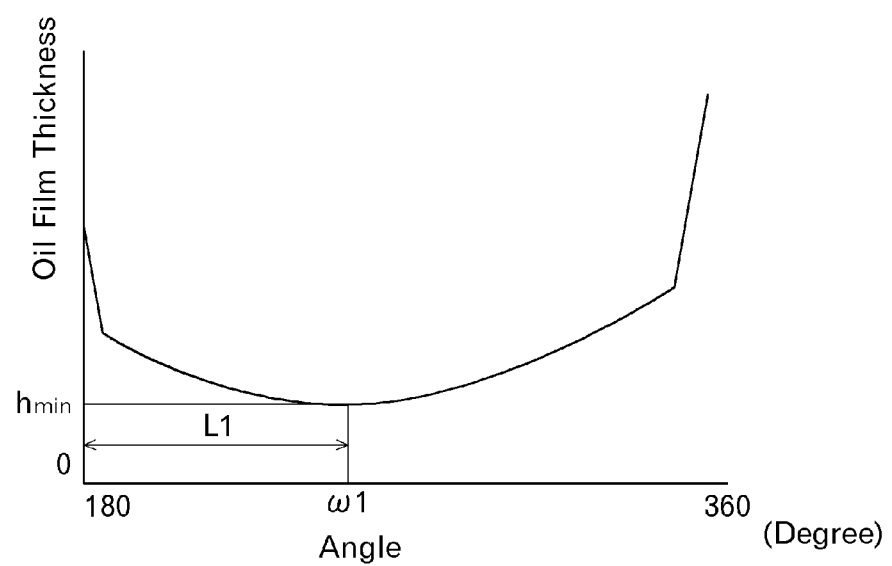
FIG. 3 is a graph which shows the relation between bearing angle and oil film thickness (as calculated value).

Next, the length l of the narrow groove 3 is explained with the FIG. 3

At first, the case is explained that the length l of the narrow groove 3 is the length L1 from the mating surface on the downstream side of the rotation direction to the place of the minimum oil film thickness $h_{min}$.

The FIG. 3 is a graph which shows the relation between a bearing angle $\omega$ and the oil film thickness h. The oil film thickness h is calculated based on the relation between the engine speed, the radius of the bearing, the width of the bearing, the viscosity of the oil, and crankshaft angle and the bearing load. The oil film thickness h decreases to minimum oil film thickness $h_{min}$ with increasing the bearing angle $\omega$ from the mating surface on the downstream side of the rotation direction and increases with increasing the bearing angle $\omega$.

Thus, the length L1 of the narrow groove 3 is configured from the mating surface on the downstream side of the rotation direction (bearing angle $\omega$ is 180 degrees) to the bearing angle $\omega 1$ where the oil film thickness becomes the minimum oil film thickness $h_{min}$. Furthermore, bearing angle $\omega 1$ is the range of 180 degrees to 270 degrees. More detailed, bearing angle $\omega 1$ is the range of 225 degrees to 270 degrees.

Next, the case is explained that the length l of the narrow groove 3 is the length L2 from the mating surface on the downstream side of the rotation direction to the place where the oil film pressure gradient is the maximum oil film pressure gradient $\Delta P_{Max1}$.

Figure 4:
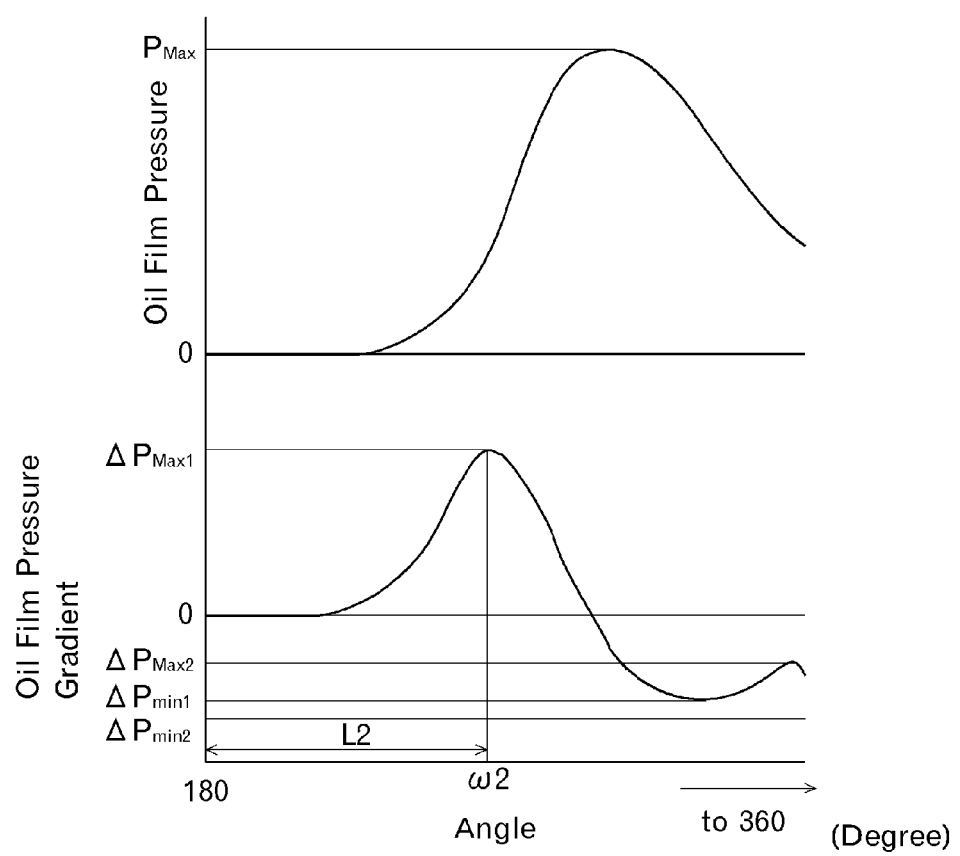
FIG. 4 is graph which shows the relation between bearing angle and oil film pressure at the center part in the axial direction and the relation between bearing angle and oil film pressure gradient (as calculated value).

The FIG. 4 is a graph which shows the relation between the bearing angle $\omega$ and the oil film pressure P and the relation between the bearing angle $\omega$ and the oil film pressure gradient $\Delta P$. The oil film pressure P in the FIG. 4 is calculated based on the relation between the engine speed, the radius of the bearing, the width of the bearing, the viscosity of the oil, and the crankshaft angle and the bearing load. The oil film pressure P increase to the maximum value $P_{Max}$ as drawing the curve upward with increasing the bearing angle $\omega$ from the mating surface on the downstream side of the rotation direction and decreases with increasing the bearing angle $\omega$.

The oil film pressure gradient $\Delta P$ indicates the gradient of the inclination of the tangent at the point of the oil film pressure P and as shown in the FIG. 4 the oil film pressure gradient $\Delta P$ increases to the local maximum value $\Delta P_{Max1}$ with increasing the bearing angle $\omega$ and decreases to the local minimum value $\Delta P_{min1}$ with further increasing the bearing angle $\omega$. The oil film pressure gradient $\Delta P$ increases to the local maximum value $\Delta P_{Max2}$ with further increasing the bearing angle $\omega$ and decreases to the local minimum value $\Delta P_{min2}$ with further increasing the bearing angle $\omega$. The oil film pressure gradient $\Delta P$ increases with further increasing the bearing angle $\omega$. The local maximum value $\Delta P_{Max1}$ is bigger than local maximum value $\Delta P_{Max2}$.

Thus, the length L2 of the narrow groove 3 is configured from the mating surface on the downstream side of the rotation direction (bearing angle $\omega$ is 180 degrees) to the bearing angle $\omega 2$ where the oil film pressure gradient is the maximum oil film pressure gradient $\Delta P_{Max1}$. Furthermore, the bearing angle $\omega 2$ is the range of 180 degrees to 270 degrees. More detailed, bearing angle $\omega 2$ is the range of 225 degrees to 270 degrees.

Next, the case is explained that the length l of the narrow groove 3 is the length L3 in which the percentage of the minimum oil film thickness of the slide bearing 1 with processing the narrow groove 3 to the bearing angle $\omega 3$ to the minimum oil film thickness (100%) of the slide bearing without a groove is 80%. The minimum oil film thickness of the slide bearing 1 in which the percentage of the minimum oil film thickness is 80% is the oil film thickness which is at least necessary for safe lubrication of the slide bearing 1.

Figure 5:
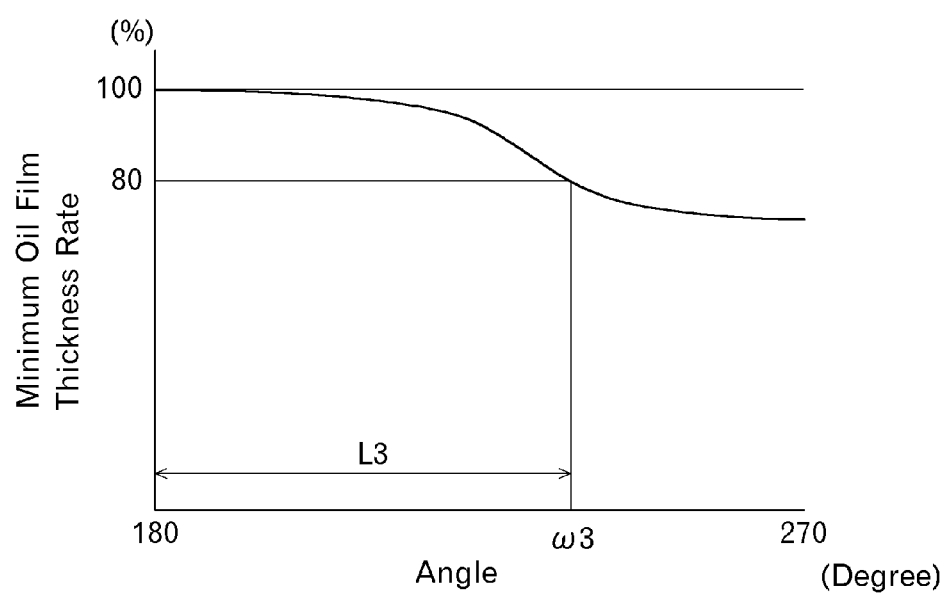
FIG. 5 is a graph which shows the relation between bearing angle and rate of minimum oil film thickness.

The FIG. 5 is a graph which shows the relation between the bearing angle $\omega$ and the percentage of the minimum oil film thickness. The percentage of the minimum oil film thickness is the percentage of the minimum oil film thickness of the slide bearing 1 processing the narrow groove 3 to the bearing angle to the minimum oil film thickness (100%) of the slide bearing without a groove. The percentage of the minimum oil film thickness in the FIG. 5 is calculated based on the relation between the engine speed, the radius of the bearing, the width of the bearing, the viscosity of the oil, and the crankshaft angle and the bearing load. The percentage of the minimum oil film thickness decreases with increasing the length l of the narrow groove 3. Therefore, the percentage of the minimum oil film thickness of the slide bearing 1 with processing the narrow groove 3 to the bearing angle ω to the minimum oil film thickness of the slide bearing without a groove is smaller than 100%.

Thus, the length L3 of the narrow groove 3 is configured as the length L3 from the mating surface on the downstream side of the rotation direction (bearing angle ω is 180 degrees) to bearing angle ω3 in which the percentage of the minimum oil film thickness is 80%. The bearing angle ω3 is the range of 180 degrees to 270 degrees. More detailed, bearing angle ω3 is the range of 225 degrees to 270 degrees.

As shown in the FIG. 6(*a*), by providing the narrow groove 3 at the edge in the axial direction, the pressure gradient at the edge in the axial direction is able to be changed. Therefore, compared to without the narrow groove 3 shown in the FIG. 6(*b*), at the narrow groove 3 with increasing the pressure gradient which descends from the edge of the bearing to the center of the bearing, the suck back volume of the oil increases and the total volume of effluent oil can be reduced.

The FIG. 7(*a*) is a graph which shows the relation between an engine speed and the change amount of the Friction Mean Effective Pressure (FMEP) in the each temperature. A circle (○) shows the change amount of the Friction Mean Effective Pressure (FMEP) in the temperature T1 and a square (□) shows the change amount of the Friction Mean Effective Pressure (FMEP) in the temperature T2. T1 is bigger than T2. By providing the narrow groove 3, as shown the FIG. 7(*a*), regardless of the temperature of the oil the Friction Mean Effective Pressure can reduce. The FMEP is the value to see the tendency of the friction and the reduction of the FMEP means the reduction of the friction.

The FIG. 7(*b*) is a graph which shows the relation between an engine speed and the change volume of oil per minutes in the each temperature. A circle (○) shows the change volume of the effluent oil per minutes in the temperature T1 and a square (□) shows the change volume of the effluent oil per minutes in the temperature T2. By providing the narrow groove 3, as shown the FIG. 7(*b*), in the low temperature area of the oil in which T1 and T2 are contained, there is few change of the volume of the effluent oil per minutes and the increase of the total effluent oil can inhibit.

As stated above, the slide bearing 1 in which halved members 2, 2 made by dividing a cylinder in two in a direction parallel to the axial are disposed vertically, narrow grooves 3 are provided at the end of the slide bearing in the circumferential direction from the mating surface on the downstream side of the rotation direction to the bearing angle ω and the bearing angle ω is the angle which is rotated in the range of ≥0 degree to ≤90 degrees from the mating surface on the downstream side of the rotation direction (bearing angle ω is 180 degrees) and in other words the bearing angle ω is the range of 180 degrees to 270 degrees.

By the structure, the narrow grooves which do not prevent the generation of the oil film pressure, the friction-reducing effect can be obtained with reducing the frictional area and the total volume of effluent oil can be reduced.

The length l of the narrow grooves 3 is the length L1 from the mating surface on the downstream side of the rotation direction to the bearing angle ω1 of the upstream side where the oil film thickness becomes the minimum oil film thickness $h_{min}$.

By the structure, the narrow grooves which do not prevent the generation of the oil film pressure, the friction-reducing effect can be obtained with reducing the frictional area and the total volume of effluent oil can be reduced.

The length l of the narrow grooves 3 is the length L2 from the mating surface on the downstream side of the rotation direction to the bearing angle ω2 of the upstream side where the oil film pressure gradient becomes the maximum oil film pressure gradient.

By the structure, the narrow grooves which don't prevent the generation of the oil film pressure, the friction-reducing effect can be obtained with reducing the frictional area and the total volume of effluent oil can be reduced.

The length l of the narrow grooves 3 is the length L3 by which the percentage of the minimum oil film thickness (100%) of the slide bearing 1 in which the narrow grooves 3 are processed to the specified bearing angle ω3 to the minimum oil film thickness of a slide bearing without grooves is more than 80%.

By the structure, the narrow grooves which do not prevent the generation of the oil film pressure, the friction-reducing effect can be gotten with reducing the frictional area and the total volume of effluent oil can be reduced.

INDUSTRIAL APPLICABILITY

The present invention is acceptable to the skill of the slide bearing and acceptable to the slide bearing in which halved members made by dividing a cylinder in two in a direction parallel to the axial are disposed vertically.

Description of Notations

1 slide bearing
2 halved member
3 narrow groove
11 crankshaft

The invention claimed is:

1. A slide bearing in which halved members made by dividing a cylinder in two in a direction parallel to an axial direction are disposed vertically,
   wherein narrow grooves are provided at an end of the lower halved member in a circumferential direction from a mating surface on a downstream side of a rotation direction to a specified bearing angle,
   wherein the specified bearing angle is an angle which is rotated in the range of ≥0 degree to ≤90 degrees from the mating surface on the downstream side of the rotation direction, and
   wherein a length of each of the narrow grooves is from the mating surface on the downstream side of the rotation direction to a place of an upstream side where an oil film thickness becomes minimum.

2. A slide bearing in which halved members made by dividing a cylinder in two in a direction parallel to an axial direction are disposed vertically,
   wherein narrow grooves are provided at an end of the lower halved member in a circumferential direction from a mating surface on a downstream side of a rotation direction to a specified bearing angle,
   wherein the specified bearing angle is an angle which is rotated in the range of ≥0 degree to ≤90 degrees from the mating surface on the downstream side of the rotation direction, and
   wherein a length of each of the narrow grooves is from the mating surface on the downstream side of the rotation direction to a place of an upstream side where an oil film pressure gradient becomes maximum.

3. A slide bearing in which halved members made by dividing a cylinder in two in a direction parallel to an axial direction are disposed vertically, wherein narrow grooves are provided at an end of the lower halved member in a circumferential direction from a mating surface on a downstream side of a rotation direction to a specified bearing angle, wherein the specified bearing angle is an angle which is rotated in the range of ≥0 degree to ≤90 degrees from the mating surface on the downstream side of the rotation direction, and wherein a length of each of the narrow grooves is the length by which a percentage of a minimum oil film thickness of the slide bearing in which the narrow grooves are processed to the specified bearing angle to a minimum oil film thickness of a slide bearing without grooves is more than 80%.

* * * * *